United States Patent
Jeong et al.

(10) Patent No.: US 9,615,388 B2
(45) Date of Patent: Apr. 4, 2017

(54) COMMUNICATION METHOD AND APPARATUS USING WIRELESS LAN ACCESS POINT

(71) Applicant: Samsung Electronics Co., Ltd., Gyeonggi-do (KR)

(72) Inventors: Sang Soo Jeong, Gyeonggi-do (KR); Song Yean Cho, Seoul (KR); Han Na Lim, Seoul (KR)

(73) Assignee: SAMSUNG ELECTRONICS CO., LTD, Suwon-si, Gyeonggi-Do (KR)

( * ) Notice: Subject to any disclaimer, the term of this patent is extended or adjusted under 35 U.S.C. 154(b) by 144 days.

(21) Appl. No.: 14/386,743

(22) PCT Filed: Mar. 19, 2013

(86) PCT No.: PCT/KR2013/002243
§ 371 (c)(1),
(2) Date: Sep. 19, 2014

(87) PCT Pub. No.: WO2013/141572
PCT Pub. Date: Sep. 26, 2013

(65) Prior Publication Data
US 2015/0092688 A1 Apr. 2, 2015

Related U.S. Application Data

(60) Provisional application No. 61/612,484, filed on Mar. 19, 2012.

(30) Foreign Application Priority Data

Mar. 30, 2012 (KR) .................. 10-2012-0033412

(51) Int. Cl.
*H04W 4/00* (2009.01)
*H04W 76/02* (2009.01)
(Continued)

(52) U.S. Cl.
CPC .......... *H04W 76/021* (2013.01); *H04W 8/26* (2013.01); *H04W 60/005* (2013.01); *H04W 72/00* (2013.01); *H04W 84/12* (2013.01)

(58) Field of Classification Search
CPC ........ H04L 5/00; H04W 72/00; H04W 72/04; H04W 84/12
(Continued)

(56) References Cited

U.S. PATENT DOCUMENTS 6,311,055 B1   10/2001   Boltz
7,633,909 B1*  12/2009   Jones .................. H04L 63/0272
                                                          370/338

(Continued)

FOREIGN PATENT DOCUMENTS

EP      2083599 A2     7/2009
JP      2009-514348 A  4/2009
(Continued)

OTHER PUBLICATIONS

Extended European Search Report dated Nov. 6, 2015 in connection with European Patent Application No. 13763879.7, 7 pages.
(Continued)

*Primary Examiner* — Chi H Pham
*Assistant Examiner* — Alexander O Boakye

(57) ABSTRACT

The present invention relates to a communication method and apparatus using a wireless local area network access point (WLAN AP). The communication method of the WLAN AP according to one embodiment of the present invention may include step of storing identifiers by correlating a first identifier to be used for the WLAN AP to identify user equipment (UE) with a second identifier to be used for an eNodeB (eNB) to identify the UE, step of receiving, from the UE, a first packet including the first identifier and data, step of creating a second packet, when
(Continued)

the first packet is received, by combining the second identifier corresponding to the first identifier with the data of the first packet, and step of transmitting the second packet to the eNB.

16 Claims, 13 Drawing Sheets

(51) Int. Cl.
*H04W 8/26* (2009.01)
*H04W 60/00* (2009.01)
*H04W 72/00* (2009.01)
*H04W 84/12* (2009.01)

(58) Field of Classification Search
USPC ........ 370/338, 328, 329, 342–348, 419–420; 455/411
See application file for complete search history.

(56) References Cited

U.S. PATENT DOCUMENTS

| | | |
|---|---|---|
| 2005/0169223 A1 | 8/2005 | Crocker et al. |
| 2008/0248747 A1 | 10/2008 | Buckley |
| 2010/0067434 A1 | 3/2010 | Siu et al. |
| 2011/0142047 A1* | 6/2011 | Choi .................. H04L 45/742 370/392 |
| 2011/0182270 A1 | 7/2011 | Shaheen et al. |
| 2011/0216744 A1 | 9/2011 | Taaghol et al. |
| 2011/0222523 A1 | 9/2011 | Fu et al. |
| 2013/0122904 A1 | 5/2013 | Lee et al. |

FOREIGN PATENT DOCUMENTS

| | | |
|---|---|---|
| JP | 2010-154079 A | 7/2010 |
| WO | 99/18704 A1 | 4/1999 |
| WO | WO 2009/151452 A1 | 12/2009 |
| WO | WO 2012/011788 A2 | 1/2012 |

OTHER PUBLICATIONS

International Search Report dated Jul. 26, 2013 in connection with International Patent Application No. PCT/KR2013/002243, 7 pages.

Written Opinion of International Searching Authority dated Jul. 26, 2013 in connection with International Patent Application No. PCT/KR2013/002243, 6 pages.

Japanese Patent Office, "Office Action," Japanese Application No. 2014-560858, Dec. 15, 2016, 12 pages, publisher JPO, Tokyo, Japan.

European Patent Office, "Communication pursuant to Article 94(3) EPC," Application No. 13 758 097.3 1857, Dec. 20, 2016, 7 pages, publisher EPO, Rijswijk, Netherlands.

Qualcomm Europe, "PS Bearer handling in redirection/NACC/CCO based CSFB," 3GPP TSG SA WG2 Meeting #76, Nov. 16-20, 2009, San Jose Del Cabo, Mexico, TD S2-097060, Nov. 16, 2009, 8 pages.

Alcatel-Lucent, "Originating & Terminating network Information Flows," 3GPP TSG-CT WG4#54bis Hyderabad, India, Oct. 10-14, 2011, C4-112274, Oct. 10, 2011, 4 pages.

* cited by examiner

COMMUNICATION METHOD AND APPARATUS USING WIRELESS LAN ACCESS POINT

TECHNICAL FIELD

The present invention relates to a communication method and apparatus using a wireless LAN AP in a wireless communication system.

BACKGROUND ART

FIG. 1 is a network configuration diagram of a mobile communication system using a wireless LAN.

Referring to FIG. 1, a wireless access network 100 of the LTE (Long-Term Evolution) mobile communication system as an example of a mobile communication system is shown. The wireless access network 100 includes an eNB (eNodeB; evolved Node B) 110, an MME (Mobility Management Entity) 120, an SGW (Serving-Gateway) 130, and a PGW (PDN-Gateway; Packet Data Network Gateway) 140. UE (User Equipment) is connected to an external network through the eNB 110, the SGW 130, and the PGW 140.

The eNB 110 corresponds to an existing node B of the UMTS system. The eNB 110 is connected to the UE 135 through a wireless channel. The eNB 110 performs a more complicated role than the existing node B does.

According to the LTE system, all user traffics including a real-time service such as VoIP (Voice over Internet Protocol) are serviced through a shared channel. Therefore, the LTE system requires an apparatus for collecting circumstantial information about the UEs 135 and thereby performing a scheduling. The eNB 110 takes charge of this function.

The SGW 130 is an apparatus for offering data bearer, and creates or removes data bearer under the control of the MME 120. The MME 120 is an apparatus for taking charge of various control functions, and one MME 120 may be connected to two or more eNBs 110.

The UE 135 can access the PGW 140 of the LTE system through a wireless local area network access point (WLAN AP) 150 and then transmit or receive data. However, according to conventional technology, in case the UE 135 accesses the PGW 140 through the WLAN AP 150, it should use ePDG (enhanced Packet Data Gateway) 160 which is an additional node for security, QoS (Quality of Service) mapping, or the like.

The unit to which QoS can be applied in a wireless communication system such as LTE is a bearer. One bearer is used for transmitting IP flows having the same QoS requirements. A parameter associated with QoS may be specified in a bearer, including QCI (QoS Class Identifier) and ARP (Allocation Retention Priority). One IP address corresponds to one PDN connection. A plurality of bearers may belong to one PDN connection.

As shown in FIG. 1, it is possible for the UE 135 to simultaneously use an LTE access network and a WLAN even in a convention LTE system. However, since a service is provided in the form of sharing the PGW 140 only between the WLAN and the LTE network in the current network structure, the UE 135 should use different IP addresses allocated for each of the WLAN and the LTE. This may cause a waste of an IP address. Further, considering reality that one application normally uses one IP address, it is difficult to provide a service simultaneously using the WLAN and the LTE with regard to one application. Additionally, since the LTE and the WLAN operate separately from each other, it is difficult to efficiently manage resources. Also, for utilizing the WLAN, an operator should invest in an additional network component such as ePDG 160.

DISCLOSURE OF INVENTION

Technical Problem

The present invention is proposed to solve the above drawbacks and has the aim of economizing an IP address and also allowing one application to simultaneously utilize WLAN and LTE.

Solution to Problem

In order to solve the above drawbacks, a communication method of a wireless local area network access point (WLAN AP) according to one embodiment of the present invention may comprise step of storing identifiers by correlating a first identifier to be used for the WLAN AP to identify user equipment (UE) with a second identifier to be used for an eNodeB (eNB) to identify the UE, step of receiving, from the UE, a first packet including the first identifier and data, step of creating a second packet, when the first packet is received, by combining the second identifier corresponding to the first identifier with the data of the first packet, and step of transmitting the second packet to the eNB.

In order to solve the above drawbacks, a wireless local area network access point (WLAN AP) according to one embodiment of the present invention may comprise a storage unit configured to store therein identifiers by correlating a first identifier to be used for the WLAN AP to identify user equipment (UE) with a second identifier to be used for an eNodeB (eNB) to identify the UE, a transceiver unit configured to receive, from the UE, a first packet including the first identifier and data, and a control unit configured to, when the first packet is received, create a second packet by combining the second identifier corresponding to the first identifier with the data of the first packet. The transceiver unit may be further configured to transmit the second packet to the eNB.

In order to solve the above drawbacks, a communication method of user equipment (UE) according to one embodiment of the present invention may comprise step of receiving, from an eNodeB (eNB), information for searching a wireless local area network access point (WLAN AP), step of associating with the WLAN AP, based on the information, step of transmitting, to the WLAN AP, a first identifier to be used for the WLAN AP to identify the UE with a second identifier to be used for the eNB to identify the UE, and step of transmitting, to the WLAN AP, a packet including the first identifier and data.

In order to solve the above drawbacks, user equipment (UE) according to one embodiment of the present invention may comprise a transceiver unit configured to receive, from an eNodeB (eNB), information for searching a wireless local area network access point (WLAN AP), to associate with the WLAN AP, based on the information, to transmit, to the WLAN AP, a first identifier to be used for the WLAN AP to identify the UE with a second identifier to be used for the eNB to identify the UE, and to transmit, to the WLAN AP, a packet including the first identifier and data.

Advantageous Effects of Invention

According to one embodiment of the present invention, by allowing a simultaneous use of WLAN and LTE on the basis of the same IP address (namely, based on a single PDN connection), it is possible for one application to receive high-speed data transmission through both routes of WLAN and LTE and also economize an IP address which is a restricted resource.

Additionally, according to one embodiment of the present invention, since WLAN can be directly controlled by LTE access network, it is possible to efficiently manage resources and also omit network components, such as ePDG or ANDSF (Access Network Discovery and Selection Function), required for use of WLAN.

MODE FOR THE INVENTION

Hereinafter, an embodiment of the present invention will be fully described with reference to the accompanying drawings.

In the following description, well known or widely used techniques may not be described or illustrated in detail to avoid obscuring the essence of the present invention.

For similar reasons, some elements illustrated in the figures have not necessarily been drawn to scale. Also, the dimensions of some of the elements are exaggerated relative to other elements for clarity. Like numerals are used for like and corresponding parts of the various drawings.

Although embodiments of this invention will be described hereinafter on the basis of the 3GPP (Third Generation Partnership Project) LTE system, embodiments of the present invention may be also applied to any other communication/computer system having a similar technical background and system form without departing from the scope of this invention as will be understood by those skilled in the art.

Proposed in this description is technique to interwork the WLAN with the eNB 110 and to extend the concept of a bearer created between the UE and the LTE network to the WLAN in order to overcome the limitations of the existing system. This may allow the UE to use an additional bearer through the WLAN.

Figure 1:
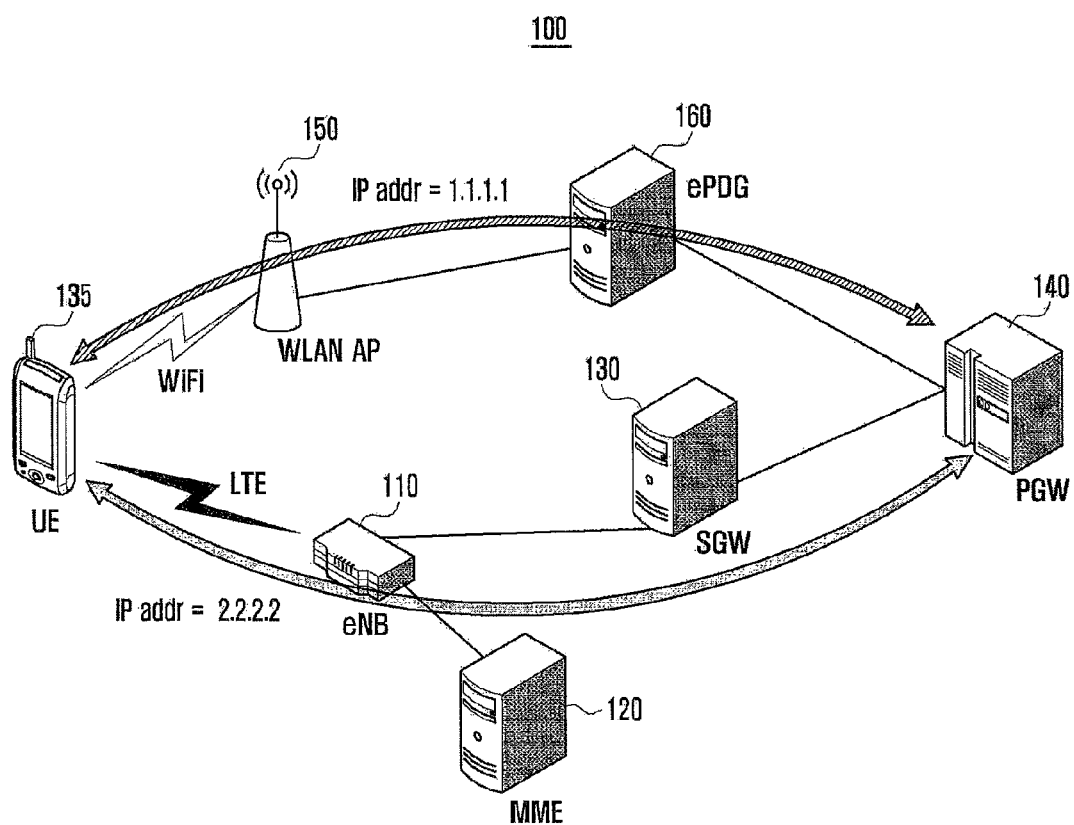
FIG. 1 is a network configuration diagram of a mobile communication system using a wireless LAN.
Figure 2A:
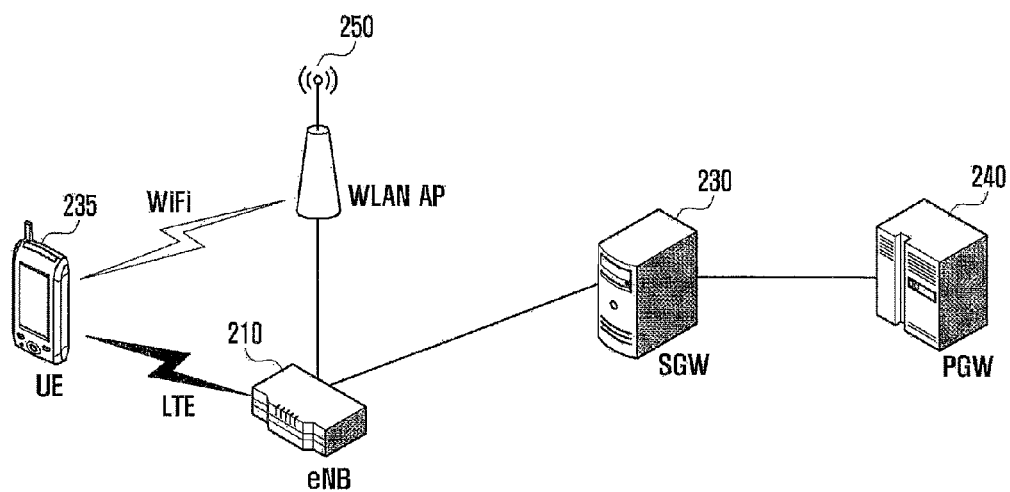
FIG. 2a is a network configuration diagram of a mobile communication system in accordance with one embodiment of the present invention.

FIG. 2a is a network configuration diagram of a mobile communication system in accordance with one embodiment of the present invention.

Figure 2B:
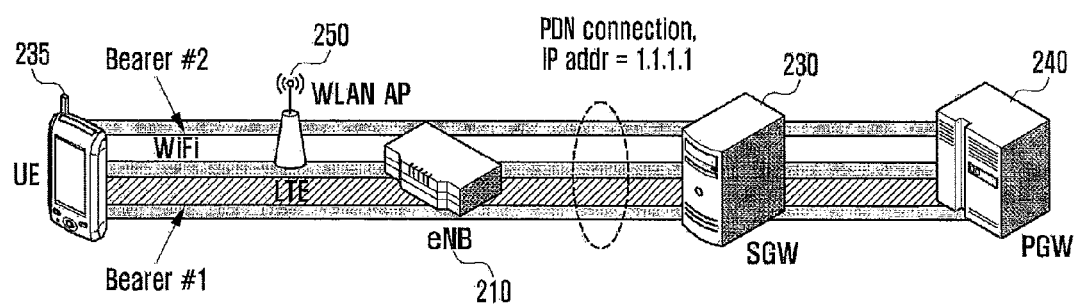
FIG. 2b is a diagram illustrating a bearer of a mobile communication system in accordance with one embodiment of the present invention.

FIG. 2b is a diagram illustrating a bearer of a mobile communication system in accordance with one embodiment of the present invention.

Referring to FIG. 2a, the mobile communication system according to one embodiment of this invention includes UE 235, an eNB 210, a WLAN AP 250, an SGW 230, and a PGW 240.

Referring to FIG. 2b, the UE 235 according to one embodiment of this invention creates and uses a bearer (e.g., bearer #1) in connection with the LTE system. At the same time, by utilizing the WLAN, the UE 235 may further create and use the bearer #2 that uses the same IP address as that of the bearer #1.

Figure 3:
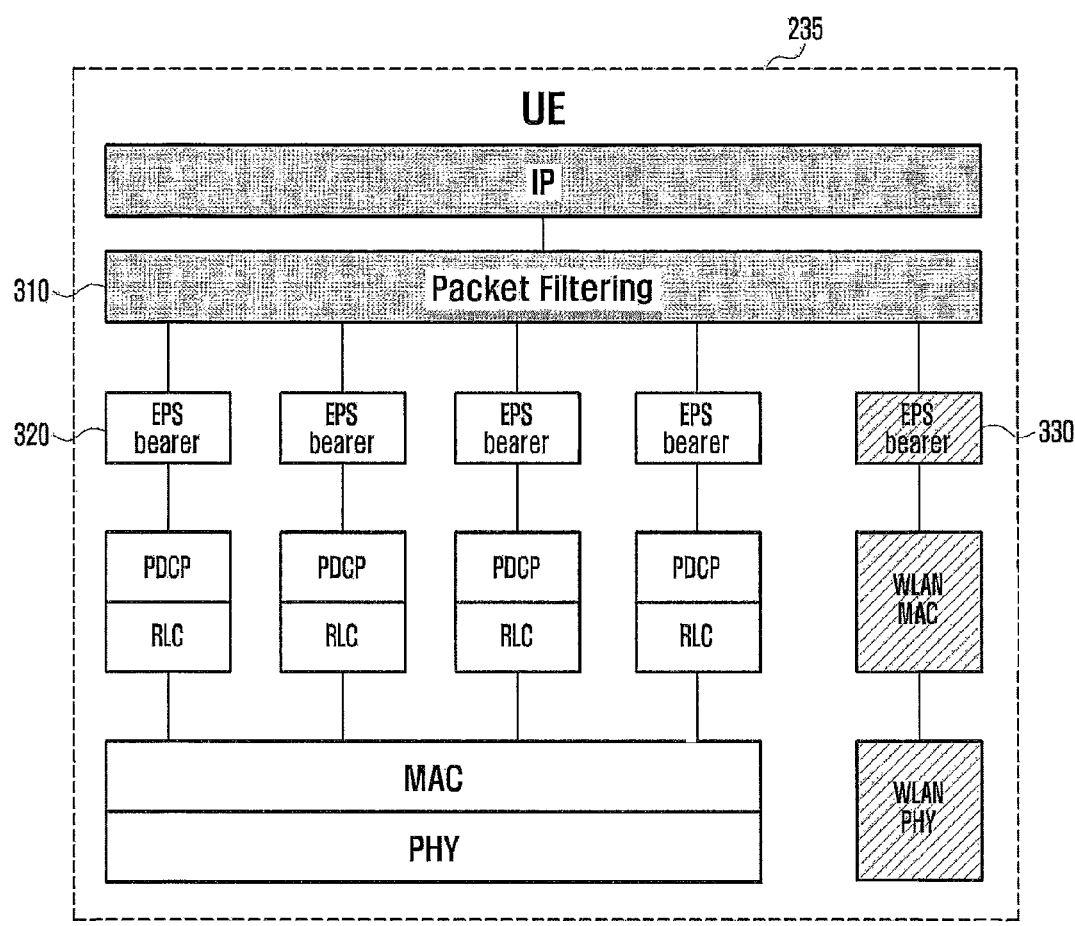
FIG. 3 is a diagram illustrating protocol layers realized in user equipment 235 in accordance with one embodiment of the present invention.

FIG. 3 is a diagram illustrating protocol layers realized in user equipment 235 in accordance with one embodiment of the present invention. The UE 235 may further create and use an EPS (Evolved Packet System) bearer 330 capable of transmitting IP packet using the WLAN in addition to an EPS bearer 320 capable of transmitting IP packet in the existing LTE system. As mentioned above, the bearer 330 of the WLAN and the existing LTE bearer 320 belong to the same PDN connection and thereby use the same IP address. Additionally, a packet filtering unit 310 determines which of bearers will be used to transmit IP packet, based on a packet filtering rule defined between the UE and the network. The conventional LTE bearer 320 performs a communication, being associated with a PDCP (Packet Data Convergence Protocol) layer, an RLC (Radio Link Control) layer, an MAC (Medium Access Control) layer, a PHY (Physical) layer, and an IP layer. Also, the EPS bearer 330 for the WLAN performs a communication, being associated with a WLAN MAC layer, a WLAN PHY layer, and the IP layer.

Figure 4A:
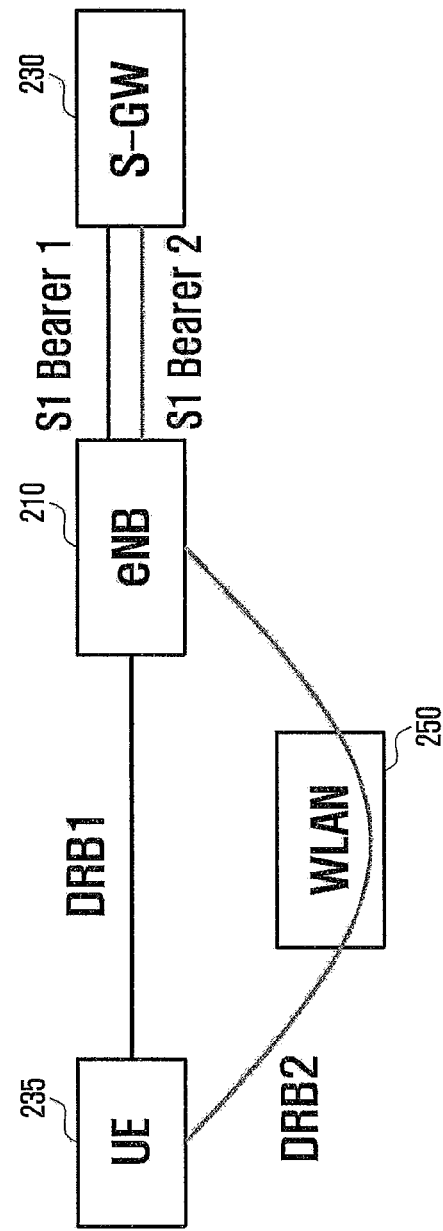
FIGS. 4a and 4b are diagrams illustrating using examples of bearers in accordance with one embodiment of the present invention.
Figure 4B:
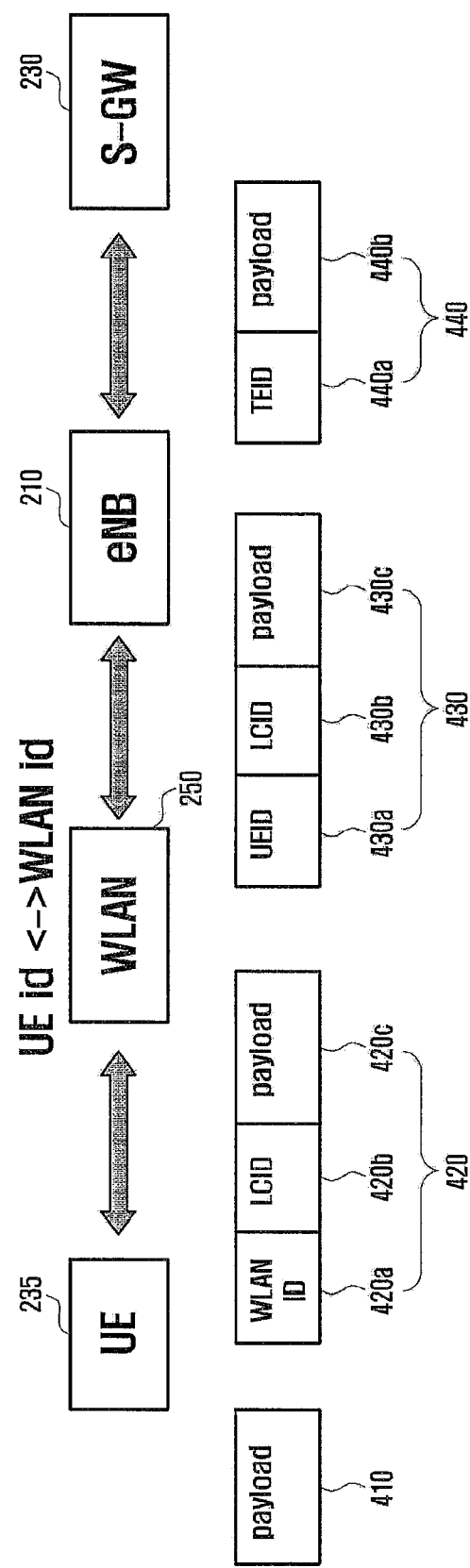

FIGS. 4a and 4b are diagrams illustrating using examples of bearers in accordance with one embodiment of the present invention. In the LTE system, EPS bearers of the UE 235 are classified into the first DRB (Data Radio Bearer) between the UE 235 and the eNB 210, an S1 bearer between the eNB 210 and the SGW 230, and an S5 bearer between the SGW 230 and the PGW 240. When the UE 235 creates a bearer by using the WLAN, it is characterized that the UE 235 creates the second DRB between the UE and the eNB 210 through the WLAN. To realize this, the UE 235, the WLAN AP 250, and the eNB 210 should be able to perform mapping of a bearer.

Referring to FIG. 4b, a user data payload 410 occurs at an upper layer. Then the UE 235 transmits, to the WLAN AP 230, an entire packet 420 created by attaching LCID (Logical Channel ID) 420b and WLAN ID 420a to payload 420c being identical to the payload 410. Here, the LCID is an identifier used when the eNB 210 identifies the DRB between the UE 235 and the eNB. Also, the WLAN ID is an identifier used when the WLAN AP 250 identifies the UE 235. If this packet 420 is received, the WLAN AP 250 can identify, through the WLAN ID 420a, the UE 235 that transmits this packet 420. Further, through the WLAN ID 420a, the WLAN AP 250 can know the eNB 210 to which this packet should be transmitted. The WLAN AP 250 modifies the WLAN ID to UE ID 430a, used in the LTE, and then transmits it to the eNB 210. The UE ID 430a is combined with LCID 430b and payload 430c to form an entire packet 430. Here, the UE ID 430a is an identifier used when the eNB 210 identifies the UE, and may include one or more of C-RNTI (Control-Radio Network Temporary Identifier), S-TMSI (SAE (System Architecture Evolution) Temporary Mobile Subscriber Identity), or IMSI (International Mobile Subscriber Identity). The LCID 430b is identical to the LCID 420b, and the payload 430c is identical to the payload 420c. Through the UE ID 430a and the LCID 430b, the eNB 210 can know a specific DRB of a specific user to which this packet belongs. Then the eNB 210 can transmit a packet 440 containing payload 440b and TEID (Tunnel Endpoint Identifier) 440a to the SGW 230. Here, the payload 440b is identical to the payload 430c. Although it is supposed herein that data is transmitted from the UE 235 to the SGW 230, data transmission may be performed in a similar manner even in case data is transmitted from the SGW 230 to the UE 235.

Figure 5:
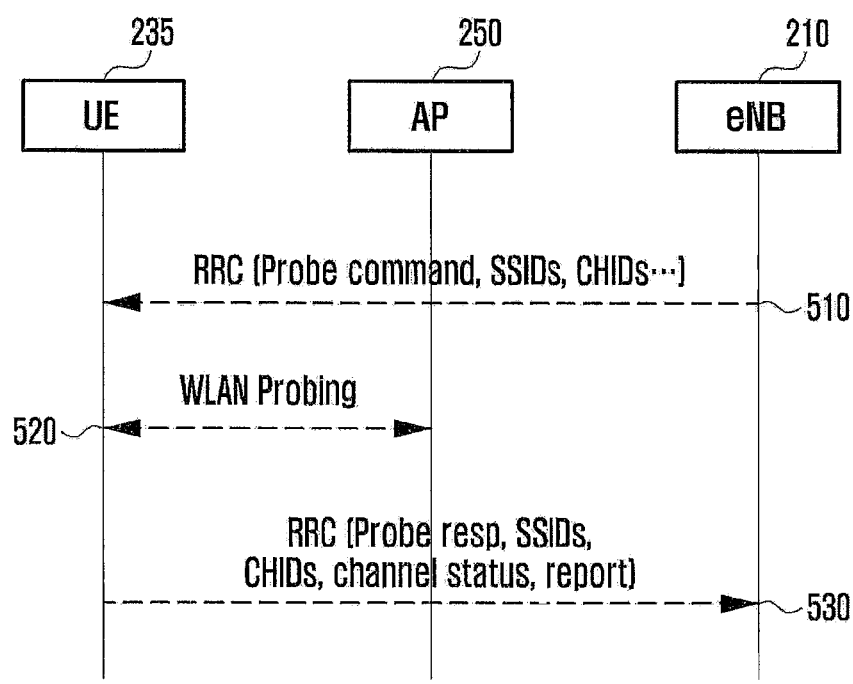
FIG. 5 is a flow diagram illustrating a procedure of reporting, at eNB 210, information about neighboring WLAN APs to the UE 235 in accordance with one embodiment of the present invention.

FIG. 5 is a flow diagram illustrating a procedure of reporting, at eNB 210, information about neighboring WLAN APs to the UE 235 in accordance with one embodiment of the present invention.

At step 510, the eNB 210 transmits an RRC (Radio Resource Control) message to the UE 235. Here, the RRC message may be a WLAN PROBE REQUEST message. The RRC message may contain an indicator, which indicates that this message is a probe command, and a target SSID (Service Set Identifier) list (or any other WLAN AP identification information). Additionally, the RRC message may further contain a channel ID list or a channel frequency list. Also, this message may further contain an indicator for indicating what kind of information should be measured and reported by the UE.

When this RRC message is received, the UE 235 collects information about WLAN APs at step 520, using the SSID list or the like of the RRC message. For example, in case the SSID list is contained in the RRC message, the UE 235 collects information about WLAN APs having such SSID (i.e., WLAN Probing). Information about WLAN APs may include one or more of ID of WLAN (SSID, BSSID (Basic Service Set Identifier), HESSID (Homogeneous Extended Service Set Identifier), etc.), a using frequency or channel ID, a WLAN type, a received signal strength, load (or congestion) information, a venue name, a roaming consortium, an NAI (Network Access Identifier) realm, and a domain name. Here, the received signal strength corresponds to a signal quality between the UE and the WLAN AP, and the load information is information to be used for predicting a service quality that can be offered to the UE that gets access to the WLAN AP. This load information may include, at least part of, the number of UEs connected to the WLAN AP, the channel utilization, the throughput of backhaul connected to the WLAN AP, the average access delay time, and the throughput available for each UE. A particular type of information about the WLAN APs to be reported may be specified in a command message received from the eNB 210 or determined on the basis of information defined in the UE 235. In case the RRC message contains a channel ID or frequency, information about the WLAN APs is collected with regard to such channel/frequency bands.

At step 530, the UE 235 reports the collected information about the WLAN APs to the eNB 210, using an RRC message. This RRC message may be a WLAN PROBE RESPONSE message. The eNB 210 may store therein this information about the WLAN APs to use it later. Particularly, the eNB 210 utilizes this information about the WLAN APs received at step 530 for determining whether to create a bearer by using the WLAN or for selecting the WLAN. According to a modified example, based on information about the WLAN APs obtained through the above steps, the eNB 210 provides information about neighboring WLAN APs to the UE 235 such that the UE 235 can reduce or eliminate a process for finding the WLAN APs. This operation may be performed for the purpose of reducing time required for the UE 235 to find and access any available WLAN AP, or reducing battery consumption required.

Figure 6:
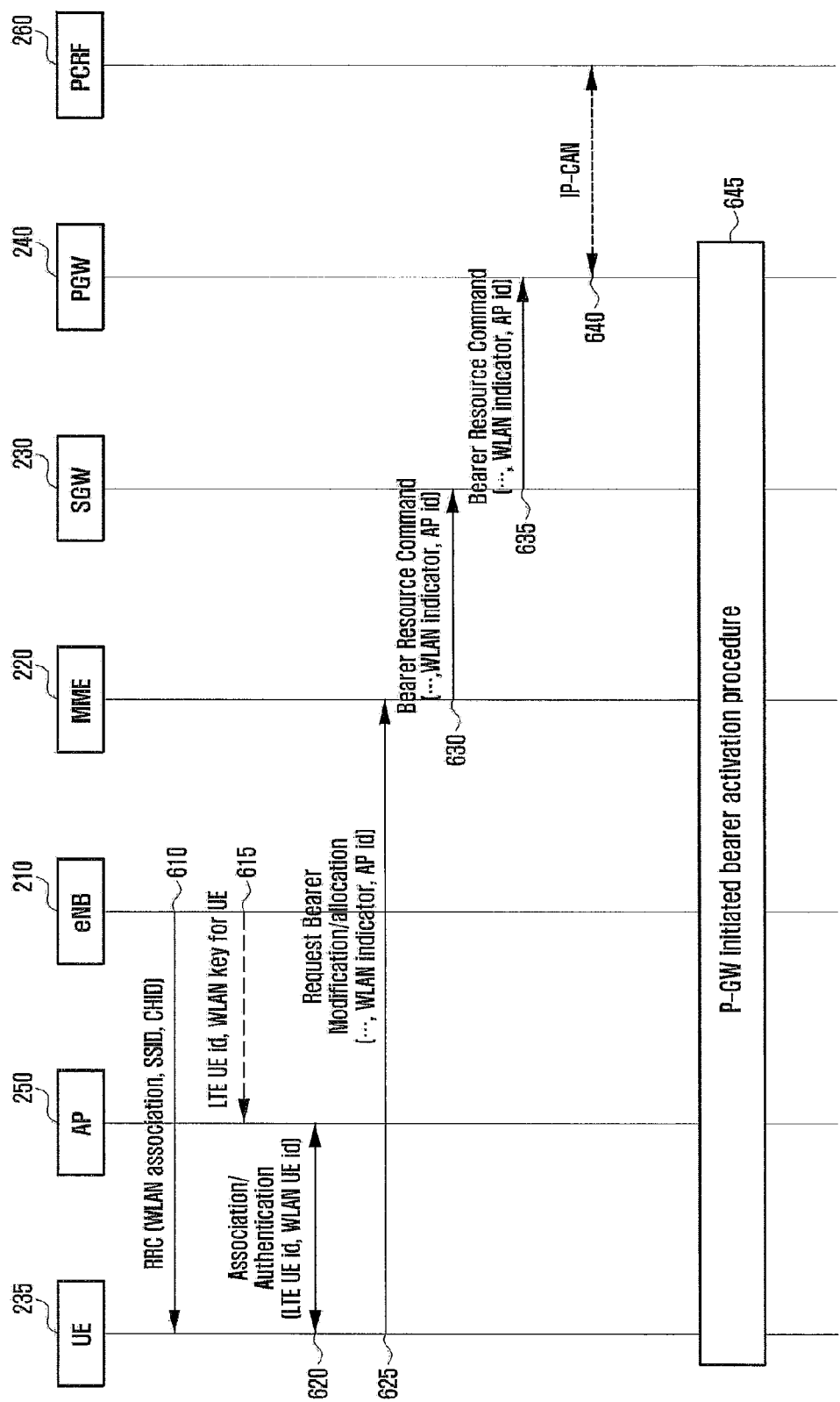
FIG. 6 is a flow diagram illustrating a procedure of creating a bearer through the UE 235 and a WLAN AP 250 in accordance with one embodiment of the present invention.

FIG. 6 is a flow diagram illustrating a procedure of creating a bearer through the UE 235 and a WLAN AP 250 in accordance with one embodiment of the present invention. If it is determined to create a WLAN bearer between the eNB 210 and the UE 235, the eNB 210 transmits an RRC message to the UE 235 at step 610. Here, this RRC message may be a WLAN SETUP COMMAND. This RRC message delivers, to the UE 235, information required for searching WLAN APs, e.g., one or more of an SSID, a channel ID, frequency information, and security context such as a key to be used with the WLAN.

At step 615, the eNB 210 may transmit information about the UE 235 to the WLAN AP 250. This information about the UE 235 may include, e.g., one or more of a UE ID used in the LTE, and security context such as a key to be used in a communication with the UE. Step 615 is optional and may be skipped according to embodiments.

At step 620, the UE 235 finds a WLAN AP by using the information about the WLAN APs received at step 615 and then performs an association/authentication procedure. In an association procedure, the UE 235 offers an LTE UE ID, i.e., an identifier used for the eNB 210 to identify the UE 235, to the WLAN AP, and also the WLAN AP 250 offers a WLAN ID, i.e., an identifier used for the WLAN AP 250 to identify the UE 235, to the UE 235. Through this, the WLAN AP 250 may create and store a mapping table about the UE ID and the WLAN ID.

If the UE 235 has already known sufficient information about the WLAN AP 250 and has passed the association procedure, steps 610, 615 and 620 may be skipped.

Thereafter, at step 625, the UE 235 transmits an NAS message to the MME 220 in order to set up a bearer. Here, the NAS message may include, e.g., a bearer resource modification message or a bearer resource allocation message. This message may contain information such as an indicator, indicating that a bearer requested by the UE 235 is a WLAN bearer, and an identifier of the WLAN AP 250, and/or an SSID. This information may be used for setting up a bearer, defining a QoS parameter, and charging at the MME 220 and the PGW 240. If the UE 235 creates or modifies the WLAN bearer in a state of having been already in association with the WLAN AP 250, the UE 235 skips steps 610 to 620 and performs a procedure from step 625. At steps 630 and 635, the MME 220 notifies the PGW 240 through the SGW 230 that the UE 235 adds a bearer through the WLAN AP 250. At step 640, the PGW 240 and the PCRF (Policy Charging Resource Function) 260 establish an IP-CAN (IP Connectivity Access Network) session. Thereafter, at step 645, the PGW 240 performs a bearer setup through a PGW initiated bearer activation procedure. The PGW initiated bearer activation procedure will be described below with reference to FIGS. 8 and 9.

Figure 7:
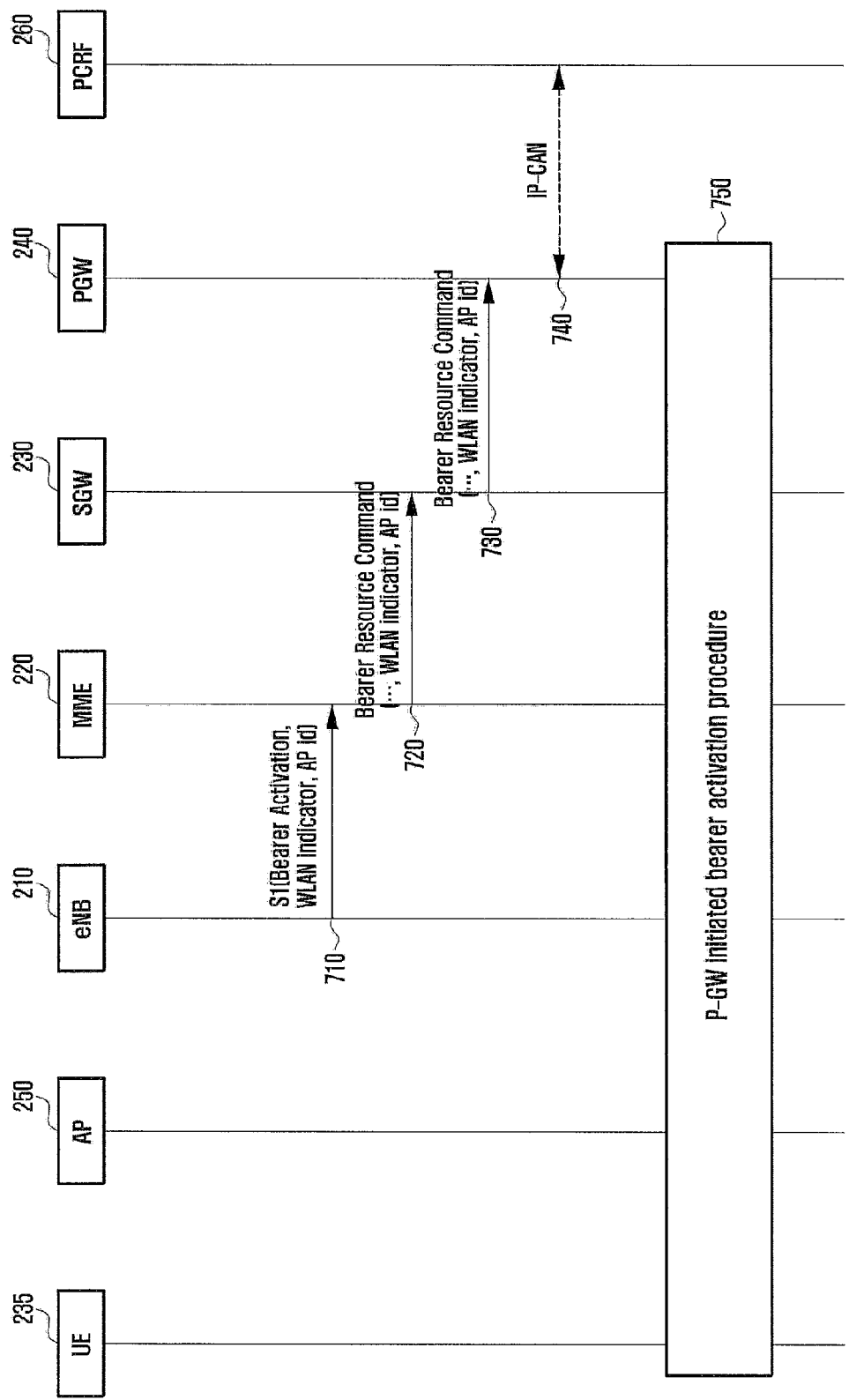
FIG. 7 is a flow diagram illustrating a procedure of creating, at the eNB 210, a bearer through the WLAN AP 250 associated with the UE 235 in accordance with another embodiment of the present invention.

FIG. 7 is a flow diagram illustrating a procedure of creating, at the eNB 210, a bearer through the WLAN AP 250 associated with the UE 235 in accordance with another embodiment of the present invention. Contrary to a procedure in FIG. 6, according to an embodiment in FIG. 7, the eNB 210 requests a WLAN bearer setup directly to the MME 220 without intervention of the UE 235.

At step 710, the eNB 210 transmit an S1 AP message to the MME 220 to set up a bearer. This message may contain information such as an ID of the UE 235, an indicator indicating that a bearer to be set up is a WLAN bearer, and an identifier or SSID of the WLAN AP 250. This information may be used for setting up a bearer, defining a QoS parameter, and charging.

At steps 720 and 730, the MME 220 notifies the PGW 240 through the SGW 230 that the UE 235 adds a bearer through the WLAN AP 250. Steps 720 and 730 are similar to steps 630 and 635.

At step 740, the PGW 240 and the PCRF 260 establish an IP-CAN session. Thereafter, at step 750, the PGW 240 performs a bearer setup through a PGW initiated bearer activation procedure. The PGW initiated bearer activation procedure will be described below with reference to FIGS. 8 and 9.

Figure 8:
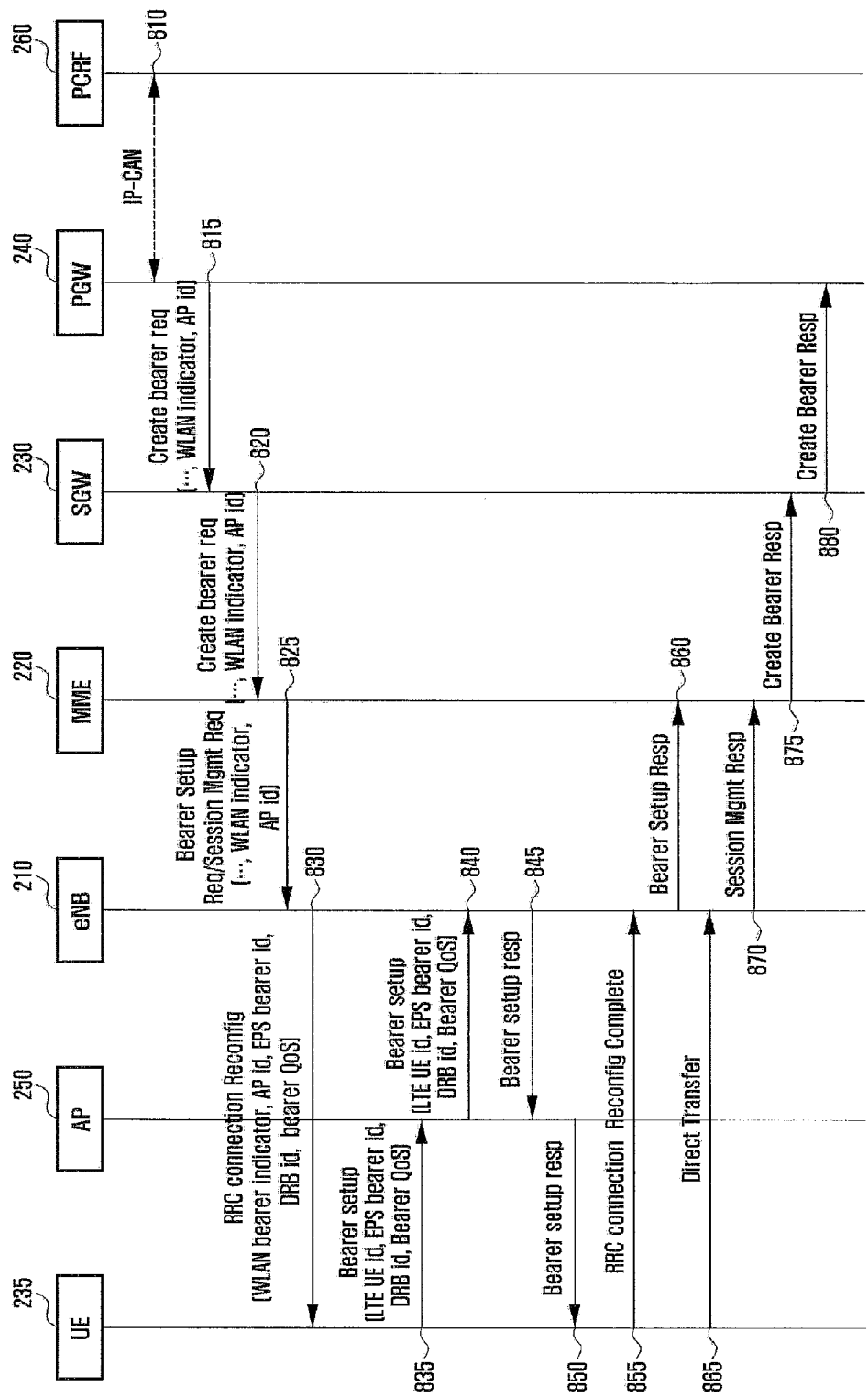
FIG. 8 is a flow diagram illustrating a procedure of PGW initiated bearer activation in accordance with one embodiment of the present invention.

FIG. 8 is a flow diagram illustrating a procedure of PGW initiated bearer activation in accordance with one embodiment of the present invention. This procedure may be performed after the above-discussed procedure in FIGS. 6 and 7 is completed.

At step 810, the PGW 240 and the PCRF 260 establish the IP-CAN session. At steps 815 and 820, the PGW 240 transmits a create session request message through the SGW 230. The create session request message may contain an indicator indicating a WLAN bearer setup and an ID or address indicating the WLAN AP 250.

At step 825, the MME 220 transmits a bearer setup request message and a session management request message to the eNB 210. The bearer setup request message and the session management request message may be transmitted together, or the bearer setup request message may be transmitted before or after transmission of the session management request message. The bearer setup request message and the session management request message may contain an indicator indicating a WLAN bearer setup and an ID or address indicating the WLAN AP 250.

At step 830, the eNB 210 transmits an RRC message for a bearer setup to the UE 235. This RRC message may contain, e.g., an RRC connection reconfiguration message. The RRC message may contain an indicator indicating a WLAN bearer setup and an ID (an AP ID or SSID) or address indicating the WLAN AP 250 as well as an EPS bearer ID, a DRB ID (LCID), and a bearer QoS parameter.

At step 835, the UE 235 transmits a bearer setup request message to the WLAN AP 250 selected using information contained in the received RRC message and NAS message (session management request). The bearer setup request message may contain an LTE UE ID, an EPS bearer ID, a DRB ID (LCID), a bearer QoS parameter, and the like.

At step 840, using this information, the WLAN AP 250 requests a bearer setup to the eNB 210.

Thereafter, the UE, the AP, and the LTE system transmit a response message. At step 845, the eNB 210 transmits, to the WLAN AP 250, a bearer setup response corresponding to the bearer setup request at step 840. At step 850, the WLAN AP 250 delivers the bearer setup response at step 845 to the UE 235. At step 855, the UE 235 transmits, to the eNB 210, an RRC connection reconfiguration completion message corresponding to the RRC connection reconfiguration message at step 830. At step 860, the eNB 210 transmits, to the MME 220, a bearer setup response message corresponding to the bearer setup request message at step 825. At step 865, direct transmission is performed from the UE 235 to the eNB 210. At step 870, the eNB 210 transmits, to the MME 220, a session management response message corresponding to the session management request message at step 825. At step 875, the MME 220 transmits, to the SGW 230, a create bearer response message to the create bearer request message at step 820. At step 880, the SGW 230 delivers the create bearer response message at step 875 to the PGW 240.

For reference, in case the procedure in FIG. 8 is performed after the procedure in FIG. 7, the UE 235 may be not yet in association with the WLAN AP 250. Therefore, in this case, the eNB 210 may deliver information for a WLAN association, i.e., an SSID, a channel ID, frequency information, security context such as a key to be used with the WLAN AP, and the like, together with the RRC connection reconfiguration message at step 830. The UE 235 receiving this performs an association procedure with the WLAN AP 250 and then performs the bearer setup procedure in FIG. 8.

Figure 9:
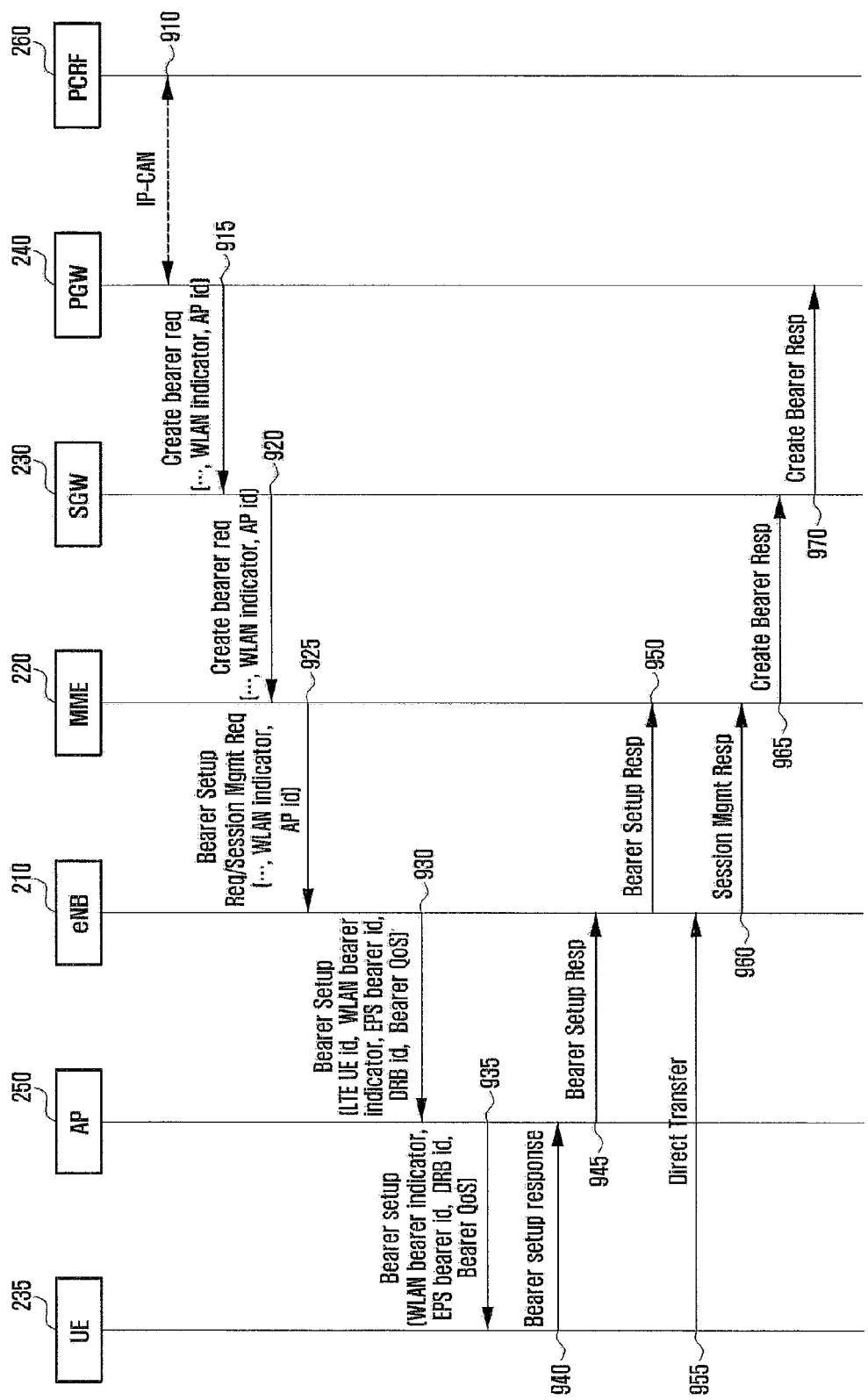
FIG. 9 is a flow diagram illustrating a procedure of PGW initiated bearer activation in accordance with another embodiment of the present invention.

FIG. 9 is a flow diagram illustrating a procedure of PGW initiated bearer activation in accordance with another embodiment of the present invention. This procedure may be performed after the above-discussed procedure in FIGS. 6 and 7.

At step 910, the PGW 240 and the PCRF 260 establish the IP-CAN session. At steps 915 and 920, the PGW 240 transmits a create session request message through the SGW 230. The create session request message may contain an indicator indicating a WLAN bearer setup and an ID or address indicating the WLAN AP 250.

At step 925, the MME 220 transmits a bearer setup request message and a session management request message to the eNB 210. The bearer setup request message and the session management request message may be transmitted together, or the bearer setup request message may be transmitted before or after transmission of the session management request message. The bearer setup request message and the session management request message may contain an indicator indicating a WLAN bearer setup and an ID or address indicating the WLAN AP 250 as well as an EPS bearer ID, a DRB ID (LCID), and a bearer QoS parameter.

At step 930, the eNB 210 transmits a bearer setup message for a bearer setup to the WLAN AP 250. The bearer setup message may contain an LTE ID of the UE 235, an EPS bearer ID, a DRB ID (LCID), a bearer QoS parameter, and the like.

At step 935, the WLAN AP 250 may find a WLAN ID of the UE 235 corresponding to the LTE ID, using a mapping table created in the association procedure. The WLAN AP 250 transmits a bearer setup message to the UE 235, using the found WLAN ID. The bearer setup message may contain an indicator indicating a WLAN bearer, an EPS bearer ID, a DRB ID (LCID), a bearer QoS parameter, and the like.

Thereafter, the UE, the AP, and the LTE system transmit a response message. At steps 940 and 945, a bearer setup response is transmitted from the UE 235 to the eNB 210 through the WLAN AP 250. The next steps 950, 955, 960, 965 and 970 correspond to steps 860, 865, 870, 875 and 880.

When the procedures shown in FIGS. 8 and 9 are completed, data may be delivered through the WLAN AP 250 and the eNB 210 as discussed above with reference to FIGS. 4a and 4b.

Although FIGS. 6 and 7 show, for simplicity, any case where a new bearer is created between the UE 235 and a network, this may be applied to a method for modifying a bearer without much changes.

Meanwhile, even in case the UE 235 transmits or receives data through the WLAN AP 250, it is required to apply integrity protection or ciphering for data security as case of transmitting or receiving data through the eNB 210. For applying this security mechanism, a process of discussing security context (e.g., key) to be used for integrity protection or ciphering between the UE and the WLAN is needed. Normally, this may be formed of a process of offering information such that the UE 235 and the WLAN AP 250 can have the same keys.

Generally in case the UE 235 transmits or receives data through the WLAN AP 250, security context used by the UE 235 and the WLAN AP 250 is offered through AAA (Authentication, Authorization and Accounting) server. However, if this method is used in the 3GPP network, a lengthy delay and much signaling are caused unfavorably due to passing through several nodes.

In order to solve this drawback, some embodiments of the present invention suggest a solution of using security context, or part thereof, used by 3GPP network, especially by the eNB 210, for data transmission/reception through the WLAN AP 250.

According to one embodiment of the present invention, when the UE 235 determines to transmit or receive data through the WLAN AP 250, the eNB 210 delivers security context (at least parts of $K_{eNB}$, $K_{eNB*}$, $K_{RRCInt}$, $K_{RRCenc}$, $K_{UPInt}$, and $K_{UPenc}$, or other similar key, other information) and identifier (ID used in LTE or WLAN) of the UE 235 to WLAN AP 250, together with or separately from other information. The WLAN AP 250 receiving them identifies the UE 235 and uses the above information to guarantee security of data for the UE 235.

The above solution has an advantage of simplicity because of requiring no separate key derivation process for the WLAN, but the security level may be not high since the same security context is used in the eNB 210 and the WLAN AP 250. To obviate this drawback, according to another embodiment of the present invention, the eNB 210 may derive security context, to be used by the WLAN AP 250, from AS (Access Stratum) security context (e.g., $K_{eNB*}$ or $K_{eNB}$) used between the eNB 210 and the UE 235, and then deliver it to the WLAN AP 250. When the eNB 210 derives new security context to be used by the WLAN AP 250, the following Equation 1 may be used.

$$F(\text{AS security context, parameter of WLAN AP}) = \text{security context of WLAN AP} \quad \text{[Equation 1]}$$

In Equation 1, F is a derivation function, and AS security context may contain parts of security context (e.g., $K_{eNB}$) being used by the eNB 210. A WLAN parameter may contain an operating frequency of the WLAN AP 250 or ID (e.g., SSID, BSSID, ESSID, HESSID, etc.) of the WLAN. Security context of the WLAN AP is security context (e.g., $K_{WLAN}$) to be used by the WLAN AP 250 in a communication with the UE 235. Security context derived using the above way is delivered to the WLAN AP 250 together with an identifier (e.g., ID used in LTE or WLAN) of the UE 235. The WLAN AP 250 receiving them identifies the UE 235 and uses the above information to guarantee security of data for the UE 235. Meanwhile, parameters used in the derivation function are information that allows the UE 235 to know in advance. Therefore, if the UE 235 uses the same derivation function and parameters, it is possible to create and use the same security context as security context to be used by the WLAN AP 250.

According to one embodiment of the present invention, the above method led by the eNB 210 may be replaced with another in which the WLAN AP 250 derives security context. Namely, the eNB 210 delivers AS security context (e.g., $K_{eNB*}$ or $K_{eNB}$), used for a communication between the eNB 210 and the UE 235, to the WLAN AP 250, together with an identifier of the UE 235. The WLAN AP 250 may identify the UE 235 and derive new security context to be used for the UE 235. For derivation of security context, the above Equation 1 may be used.

Figure 10:
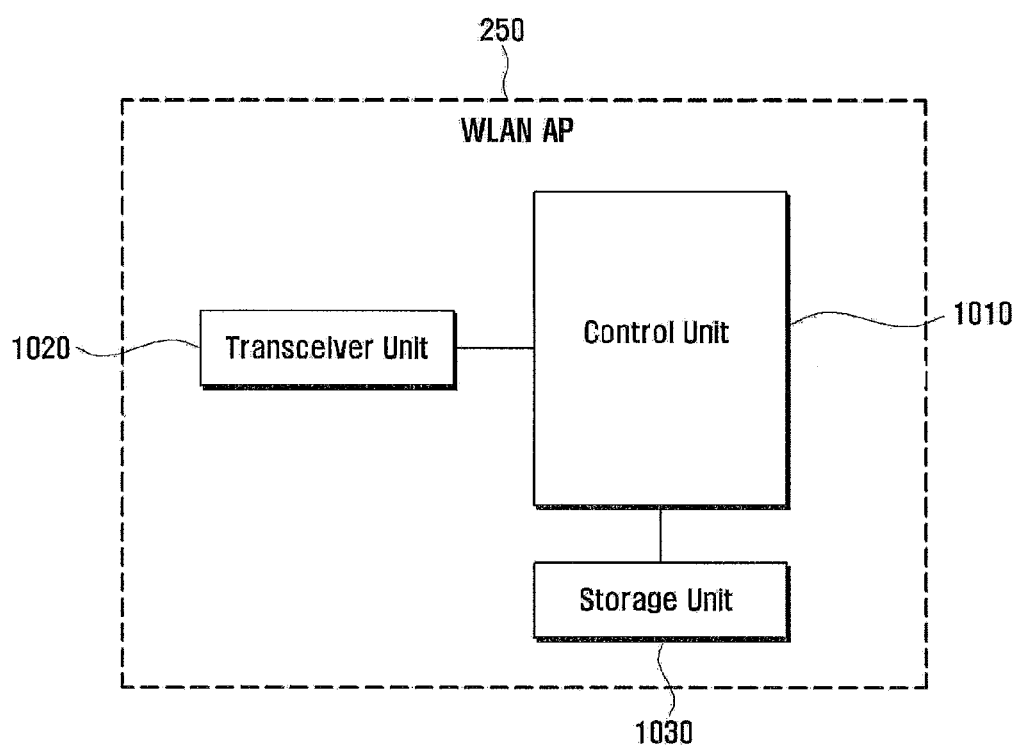
FIG. 10 is a block diagram illustrating the WLAN AP 250 in accordance with one embodiment of the present invention.

FIG. 10 is a block diagram illustrating the WLAN AP 250 in accordance with one embodiment of the present invention. The WLAN AP 250 includes a control unit 1010, a transceiver unit 1020, and a storage unit 1030. The control unit 1010 performs a control required for performing the procedures in FIGS. 4a to 9. The transceiver unit 1020 performs a communication required for performing the procedures in FIGS. 4a to 9 under the control of the control unit 1010. The storage unit 1030 stores therein information required for performing the procedures in FIGS. 4a to 9.

Particularly, the transceiver unit 1020 may receive, from the UE 235, the first identifier (WLAN ID) to be used for the WLAN AP 250 to identify the UE 235 and the second identifier (UE ID) to be used for the eNB 210 to identify the UE 235. The transceiver unit 1020 may receive, from the eNB 210, the second identifier and security context to be used for a communication with the UE 235. Additionally, the transceiver unit 1020 may receive the second identifier, an EPS (Evolved Packet System) bearer identifier, a DRB (Data Radio Bearer) identifier, and a bearer QoS (Quality of Service) parameter from the UE 235, and transmit the second identifier, the EPS bearer identifier, the DRB identifier, and the bearer QoS parameter to the eNB 210.

The storage unit 1030 may store therein the first and second identifiers, correlated with each other, to be used to identify the UE 235.

The transceiver unit 1020 may receive the first packet containing the first identifier and data from the UE 235. When the first packet is received, the control unit 1010 creates the second packet by combining the second identifier corresponding to the first identifier with the data of the first packet. The transceiver unit 1020 transmits the second packet to the eNB 210.

Figure 11:
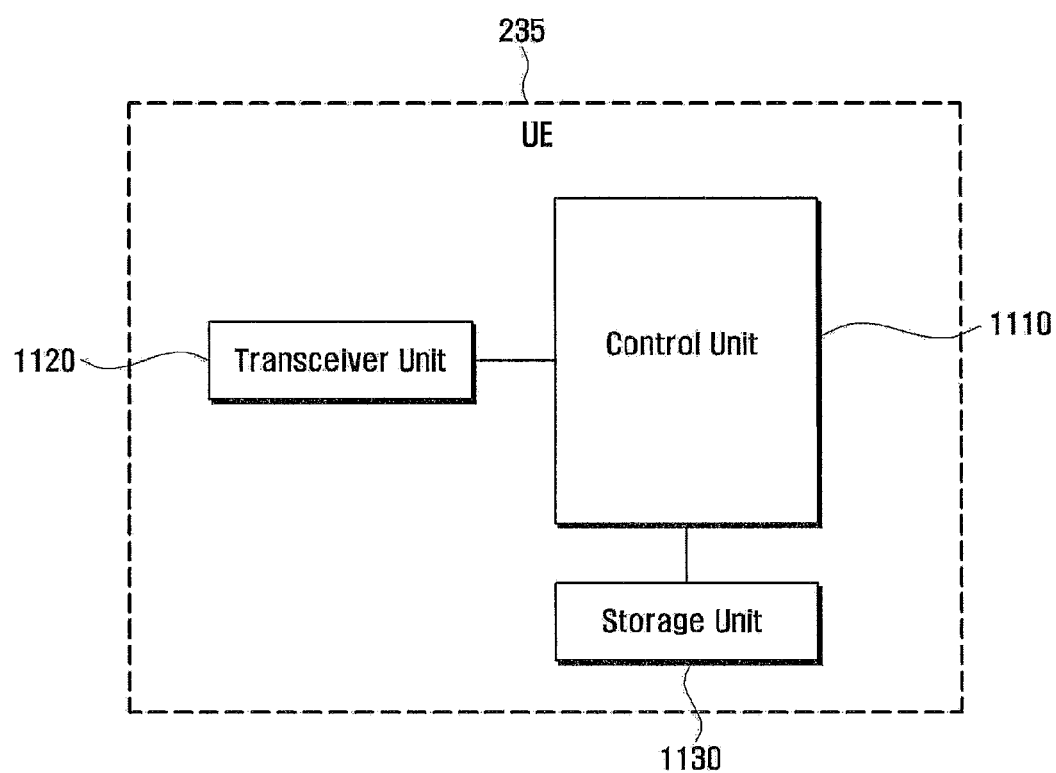
FIG. 11 is a block diagram illustrating the UE 235 in accordance with one embodiment of the present invention.

FIG. 11 is a block diagram illustrating the UE 235 in accordance with one embodiment of the present invention. The UE 235 includes a control unit 1110, a transceiver unit 1120, and a storage unit 1130. The control unit 1110 performs a control required for performing the procedures in FIGS. 4a to 9. The transceiver unit 1120 performs a communication required for performing the procedures in FIGS. 4a to 9 under the control of the control unit 1110. The storage unit 1130 stores therein information required for performing the procedures in FIGS. 4a to 9.

Particularly, the transceiver unit 1120 may receive information for searching WLAN APs from a user eNodeB (eNB) and, based on the received information, perform association with the WLAN AP 250. The transceiver unit 1120 may transmit, to the WLAN AP 250, the first identifier to be used for the WLAN AP 250 to identify the UE 235 and the second identifier to be used for the eNB 210 to identify the UE 235. The WLAN AP 250 may store therein a mapping table of the first and second identifiers according to this information. Thereafter, the transceiver unit 1120 transmits, to the WLAN AP 250, a packet containing the first identifier and data. The WLAN AP 250 may replace the first identifier with the second identifier and transmit it to the eNB 210. Additionally, the transceiver unit 1120 may transmits a bearer setup containing the second identifier, an EPS (Evolved Packet System) bearer identifier, a DRB (Data Radio Bearer) identifier, and a bearer QoS (Quality of Service) parameter to the WLAN AP 250. Through this, a bearer passing through the WLAN AP 250 is set up.

The above-discussed method is described herein with reference to flowchart illustrations of user interfaces, methods, and computer program products according to embodiments of the present disclosure. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a Field Programmable Gate Array (FPGA) or Application Specific Integrated Circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

The embodiments described above are illustrative examples and it should not be construed that the present invention is limited to these particular embodiments. Thus, various changes and modifications may be effected by one skilled in the art without departing from the spirit or scope of the invention as defined in the appended claims.

While the present invention has been particularly shown and described with reference to an exemplary embodiment thereof, it will be understood by those skilled in the art that various changes in form and details may be made therein without departing from the spirit and scope of this invention as defined by the appended claims.

The invention claimed is:

1. A communication method of a wireless local area network access point (WLAN AP), comprising steps of:
   receiving, from a user equipment (UE), an association message including a first identifier and a second identifier corresponding to the first identifier;
   storing identifiers by correlating the first identifier to be used for the WLAN AP to the UE with the second identifier to be used for an eNodeB (eNB) to identify the UE;
   receiving, from the UE, a first packet including the first identifier and data;
   generating a second packet including the second identifier corresponding to the first identifier and the data of the first packet; and
   transmitting the second packet to the eNB.

2. The method of claim 1, further comprising,
   before the step of storing the identifier, receiving, from the eNB, the second identifier and security context to be used for a communication with the UE.

3. The method of claim 1, further comprising,
   before storing the identifier:
   receiving, from the eNB, the second identifier and first security context to be used for a communication between the eNB and the UE; and
   creating second security context to be used for a communication between the WLAN AP and the UE by using the first security context and a parameter of the WLAN AP.

4. The method of claim 1, further comprising:
   receiving, from the UE, the second identifier, an evolved packet system (BPS) bearer identifier, a data radio bearer (DRB) identifier, and a bearer quality of service (QoS) parameter; and
   transmitting, to the eNB, the second identifier, the BPS bearer identifier, the DRB identifier, and the bearer QoS parameter.

5. A wireless local area network access point (WLAN AP) comprising:
   a transceiver unit configured to:
     receive, from an user equipment (UE), an association message including a first identifier and a second identifier corresponding to the first identifier;
     receive, from the UE, a first packet including the first identifier and data;
   and
     transmit to an eNodeB (eNB) a second packet;
   a storage unit configured to store the identifiers by correlating a first identifier to be used for the WLAN AP to identify UE with a second identifier to be used for an eNodeB (eNB) to identify the UE;
   and
   a control unit configured to, when the first packet is received, generate the second packet including the second identifier corresponding to the first identifier and the data of the first packet.

6. The WLAN AP of claim 5, wherein before storing the first and second identifiers, the transceiver unit is further configured to receive, from the eNB, the second identifier and security context to be used for a communication with the UE.

7. The WLAN AP of claim 5, wherein before storing the first and second identifiers, the transceiver unit is further configured to receive, from the eNB, the second identifier and first security context to be used for a communication between the eNB and the UE, and the control unit is further configured to create second security context to be used for a communication between the WLAN AP and the UE by using the first security context and a parameter of the WLAN AP.

8. The WLAN AP of claim 5, wherein the transceiver unit is further configured to:
receive, from the UE, the second identifier, an evolved packet system (EPS) bearer identifier, a data radio bearer (DRB) identifier, and a bearer quality of service (QoS) parameter; and
transmit, to the eNB, the second identifier, the EPS bearer identifier, the DRB identifier, and the bearer QoS parameter.

9. A communication method of user equipment (UE), comprising:
receiving, from an eNodeB (eNB), information for searching a wireless local area network access point (WLAN AP);
associating with the WLAN AP, based on the information;
transmitting, to the WLAN AP, a first identifier to be used for the WLAN AP to identify the UE with a second identifier to be used for the eNB to identify the UE; and
transmitting, to the WLAN AP, a packet including the first identifier and data.

10. The method of claim 9, further comprising:
transmitting, to the WLAN AP, a bearer setup including the second identifier, an evolved packet system (BPS) bearer identifier, and a bearer quality of service (QoS) parameter.

11. The method of claim 9, further comprising:
acquiring first security context to be used for a communication between the eNB and the UE; and
creating second security context to be used for a communication between the WLAN AP and the UE by using the first security context and a parameter of the WLAN AP.

12. The method of claim 9, wherein receiving the information for searching the WLAN AP from the eNB further comprises:
receiving an identifier list of the WLAN AP that is a target of search;
collecting information associated with the WLAN AP contained in the identifier list; and
transmitting, to the eNB, the collected information associated with the WLAN AP contained in the identifier list.

13. User equipment (UE), comprising:
a transceiver unit configured to:
receive, from an eNodeB (eNB), information for searching a wireless local area network access point (WLAN AP);
associate with the WLAN AP based on the information;
transmit, to the WLAN AP, a first identifier to be used for the WLAN AP to identify the UE with a second identifier to be used for the eNB to identify the UE; and
transmit, to the WLAN AP, a packet including the first identifier and data.

14. The UE of claim 13, wherein the transceiver unit is further configured to transmit, to the WLAN AP, a bearer setup including the second identifier, an evolved packet system (EPS) bearer identifier, and a bearer quality of service (QoS) parameter.

15. The UE of claim 13, further comprising:
a control unit configured to
acquire first security context to be used for a communication between the eNB and the UE; and
create second security context to be used for a communication between the WLAN AP and the UE by using the first security context and a parameter of the WLAN AP.

16. The UE of claim 13, wherein the transceiver unit is further configured to:
receive an identifier list of the WLAN AP that is a target of search;
collect information associated with the WLAN AP contained in the identifier list; and
transmit, to the eNB, the collected information associated with the WLAN AP contained in the identifier list.

* * * * *